Patented Jan. 23, 1940

2,188,103

UNITED STATES PATENT OFFICE 2,188,103

CONDENSATION PRODUCTS OF THE ANTHRAQUINONE SERIES

Fritz Baumann and Heinz Werner Schwechten, Leverkusen-I. G. Werk, Germany, assignors to General Aniline Works, Inc., New York, N. Y., a corporation of Delaware No Drawing. Application December 14, 1937, Serial No. 179,729. In Germany December 17, 1936

3 Claims. (Cl. 260—326)

The present invention relates to a process of preparing condensation products of the anthraquinone series and to the new products which are obtainable thereby.

One object of our present invention is the development of a process of preparing condensation products of the anthraquinone series. Another feature of our invention resides in the new products which are obtainable according to our process.

It has been found that new condensation products of the anthraquinone series can be prepared by causing to react anthraquinones, bearing in 2-position the carboxylic acid radical and in 3-position a cyano group, with benzyl cyanide at an elevated temperature. Preferably the reaction is carried out in the presence of an excess of benzyl cyanide.

As starting material there are suitable also those anthraquinone derivatives in which the carboxylic acid radical is replaced by a carboxylic acid amide group or a carboxylic acid ester group. Instead of applying anthraquinone compounds, bearing in 3-position the cyano group, there can also be employed those anthraquinone derivatives bearing, in 3-position, a substituent which is capable of being replaced by the cyano group. As such substituents there may be mentioned halogen atoms, preferably the chloro atom. We wish it to be understood that these conditions fall within the scope of our claims since in such case the 3-cyanoanthraquinone-2-carboxylic acids are intermediately formed. We wish to point out that we prefer to work in the presence of a condensing agent, such as cuprous cyanide, it being understood that the use of cuprous cyanide cannot be dispensed with in case anthraquinone derivatives bearing a halogen atom in 3-position are employed as starting materials.

The reaction products obtained according to the above described process separate generally from the reaction mixture. The structure of the new compounds is not definitely known; it is supposed that they correspond to the following formula:

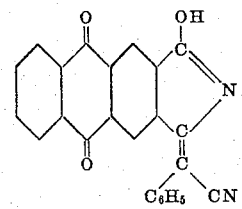

It is understood that the formula given above is only a probable one.

The compounds obtainable by the present invention are stable towards alkali and concentrated sulfuric acid and show a blue vat. They are valuable starting materials for the manufacture of new dyestuffs.

The following examples illustrate the invention, the parts being by weight:

Example 1

A solution of 30 parts of anthraquinone-2-chloro-3-carboxylic acid methyl ester (M. P. 152° C.) and 9.5 parts of cuprous cyanide in 180 parts of benzyl cyanide is heated for 2 hours to boiling, until a test portion taken therefrom is free from halogen, and yellow prisms crystallize on cooling. The whole mixture is then allowed to cool to 40° C. whereupon the yellow reaction product is filtered with suction, rinsed several times with benzyl cyanide, methanol and hot water and then dried on the water bath. The new product thus obtained is free from halogen and can be recrystallized from nitrobenzene. It is relatively easily soluble in pyridine with a yellow coloration. On suspending a test portion of the new product in pyridine water, with the addition of caustic soda lye, it is dissolved with an orange coloration. On the addition of hydrosulfite a vat of a corn-flower-blue coloration is obtained.

Besides the cuprous cyanide also the benzyl cyanide is assumed to take part in the reaction, the analysis showing two nitrogen atoms in each molecule.

Example 2

A solution of 20 parts of 2-cyanoanthraquinone-3-carboxylic methylester in 160 parts of benzyl cyanide is heated to boiling for 10–12 hours, a conversion of the colorless starting material into the yellow condensation product being effected thereby. After cooling, the reaction product is filtered with suction, rinsed and dried, and can be further purified by dissolving it in sulfuric acid. The product thus obtained exhibits similar properties to the product obtained according to Example 1.

The 2-cyanoanthraquinone-3-carboxylic methyl ester is obtained by heating for a short time to 235° C. a solution of 2-chloroanthraquinone-3-carboxylic acid methylester in benzyl cyanide with the calculated amount of cuprous cyanide. The cyanide ester thus obtained has a melting point of 247° C. and yields a reddish-violet vat.

Example 3

20 parts of 2-chloroanthraquinone-3-carboxylic acid and 6.6 parts of cuprous cyanide are heated for 2 hours in 100 parts of benzyl cyanide. During the heating the solution assumes a yellow to yellowish-brown coloration, a test portion taken therefrom yielding a clear blue vat. On working up in the usual manner, a halogen-free yellowish substance is obtained which can be purified with pyridine on account of its easy solubility. It melts at 343–344° C. like the product obtained according to Example 1.

*Example 4*

On heating for 1½ hours molar quantities of 2-chloroanthraquinone-3-carboxylic acid amide and cuprous cyanide in benzyl cyanide to 235° C. and working up the whole mixture in the usual manner, the above described product is obtained. It is soluble in sulfuric acid with a yellow coloration and separates in water in the form of lemon-yellow flakes.

We claim:

1. The process which comprises causing to react with benzyl cyanide an anthraquinone substituted in 2-position by a radical selected from the group consisting of carboxylic acid, carboxylic acid amide, and carboxylic acid ester, and having a cyano group in 3-position.

2. The process which comprises causing to react with benzyl cyanide an anthraquinone substituted in 2-position by a radical selected from the group consisting of carboxylic acid, carboxylic acid amide, and carboxylic acid ester, and having a cyano group in 3-position in the presence of a condensing agent.

3. The product which is obtained by the process as claimed in claim 1, this product corresponding to the probable formula:

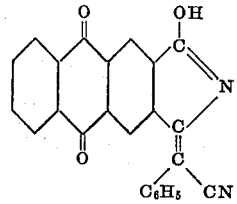

it being stable towards alkali and concentrated sulfuric acid and showing a blue vat.

FRITZ BAUMANN.
HEINZ WERNER SCHWECHTEN.